INVENTOR.
HORACE M. VARNER

INVENTOR.
HORACE M. VARNER
BY
ATTORNEY

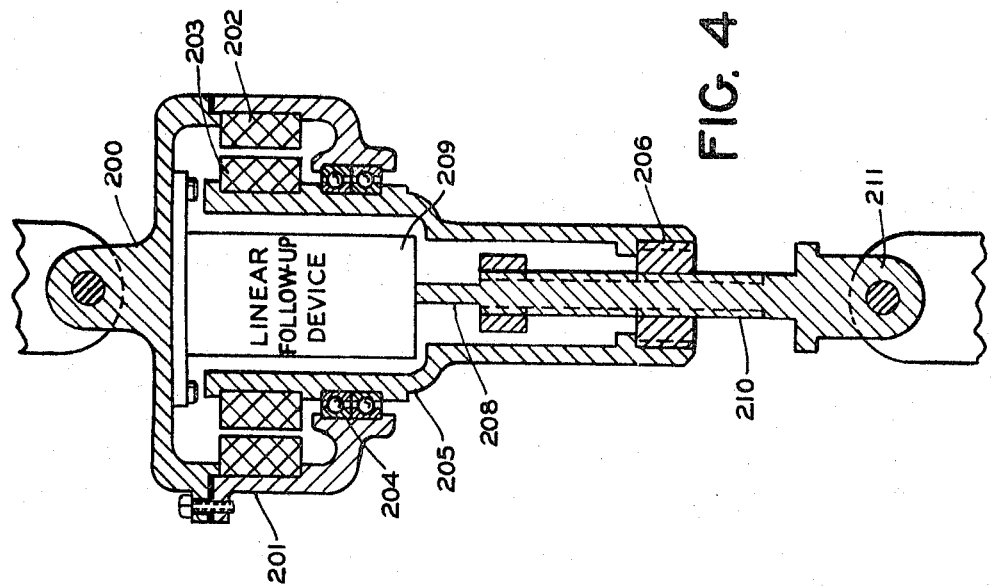
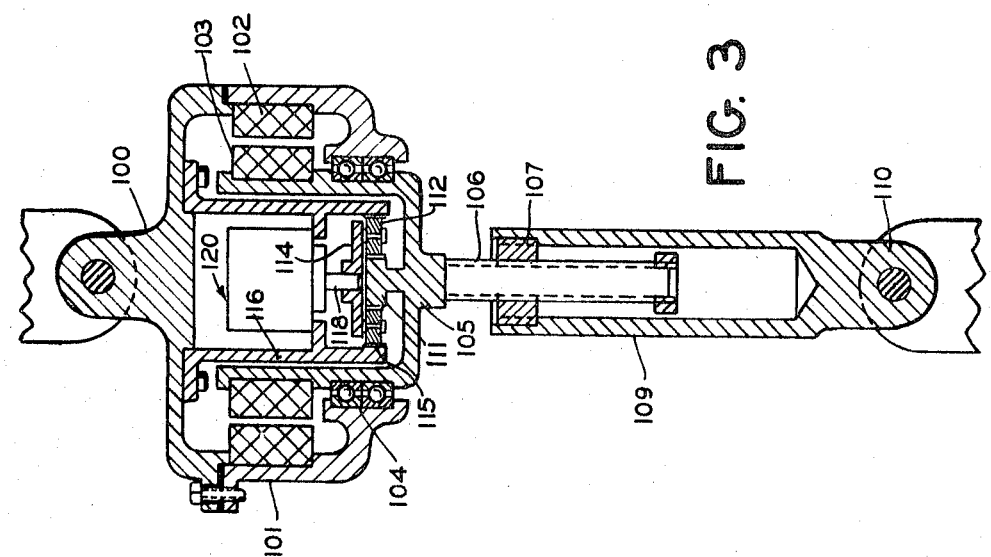

July 22, 1969

H. M. VARNER 3,457,479

LINEAR ACTUATOR AND QUADRUPLE REDUNDANT TYPE FAIL OPERATIVE
CLOSED LOOP SERVO SYSTEM

Filed July 27, 1965

INVENTOR.
HORACE M. VARNER
BY
Hubert L. Davis

ATTORNEY

United States Patent Office 3,457,479
Patented July 22, 1969

3,457,479
LINEAR ACTUATOR AND QUADRUPLE REDUNDANT TYPE FAIL OPERATIVE CLOSED LOOP SERVO SYSTEM
Horace M. Varner, Livingston, N.J., assignor to The Bendix Corporation, Teterboro, N.J., a corporation of Delaware
Filed July 27, 1965, Ser. No. 475,141
Int. Cl. H02p 1/54, 5/46, 7/68
U.S. Cl. 318—18    12 Claims

ABSTRACT OF THE DISCLOSURE

A linear actuator and quadruple redundant type fail operative actuation system including a tubular jackshaft member for driving a jackscrew member; characterized by an improved compact arrangement of a follow-up device positioned within the tubular jackshaft member, together with means positioned within the tubular jackshaft member for operatively connecting one of the members to the follow-up device.

The invention described herein was made in the performance of work under a NASA contract and are subject to the provisions of Section 305 of the National Aeronautics and Space Act of 1958, Public Law 85–568 (72 Stat. 426; 42 USC 2457), as amended.

The invention herein relates to a linear actuator of a quadruple redundant type fail operative actuation system and more particularly to a linear actuator with motor rotors which are mounted directly on a jackscrew rotating member in which a follow-up arrangement is mounted within a cavity provided by motor and jackshaft bearings and in which follow-up arrangement there may be provided suitable gang potentiometers driven internally within a sealed actuator housing by a planetary system. Furthermore, the arrangement is such that there are provided four prime mover rotors mounted directly on the jackshaft so as to actuate a single rotating output member, each of the prime mover rotors being part of a separate servo motor system in which three of the servo prime mover motors will assume and maintain the required performance in the event any one of the four servo prime mover motors may fail.

In the redundant type fail operative actuation system, redundancy requirements are met by designing all of the four servo motors so as to have equal output performance capabilities and so that any two servo motors provide the required output performance. Thus, in both a null type of inoperative failure of any two servo systems and a "hard over" failure of a single servo system, the motor of the malfunction servo system will be driven along with the load by the two or three remaining servo motors.

An object of the invention, therefore, is to provide a linear actuator configuration in which the motor rotors are mounted directly on a single jackscrew rotating member.

Another object of the invention is to provide a compact mechanical arrangement with a rotary jackshaft or rotary nut and with a rotary or linear motion follow-up element mounted within the motor shaft.

Another object of the invention is to provide a novel linear actuator in which a combination of minimum backmounted on the jackscrew offers a backlash free connection between the drive motors and the jackshaft and a configuration having no gearing so as to provide a lower reflected rotor inertia to the output.

Another object of the invention is to provide a novel linear actautor in which a combination of minimum backlash and low inertia provides a linear actuator servo system of higher performance capabilities than may be attained by conventional means.

Another object of the invention is to provide a novel actuator system in which four prime movers are mounted to actuate a single output member and in which the prime movers are each a part of a separate servo system including a preamplifier which receives a command signal and a follow-up signal back from a driven member so as to produce an output to control a power amplifier; the power amplifier being arranged to receive an input from the preamplifier so as to control the power applied through the power amplifier to the prime mover from a suitable power source; the prime mover which receives power from the power amplifier in turn applies power to a driven member; and there is further provided a follow-up device which produces a signal as an input to the preamplifier as a function of motion of the driven member.

Another object of the invention is to provide a quadruple redundant type fail operative actuation system in which there are provided four servo systems each having power and signal inputs isolated from the others.

Another object of the invention is to provide a quadruple redundant type fail operative actuation system in which the servo systems are so selected and arranged that any two can produce a specified performance so that if a single servo system malfunctions in such a way as to cause undesired motion of the driven member, the remaining three separate systems will override the fail system and produce the specified performance.

In considering the quadruple redundant type system, it may be noted that if only three servo systems were used, each system must have a capability such as to produce the specified performance. Thus, with performance capability a function of system weight and power input, a system using four half performance servo systems would be lighter and use less power than three full performance servo systems by a ratio of two to three.

An object, therefore, of the invention is to provide a quadruple passive-redundant fail operative servo system of lighter weight and power than a triplicated system. The term passive being so used as to mean that there are no active system elements required to monitor for failures and either remove a failed element, engage a replacement element, or both.

Another object of the invention is to provide a quadruple redundant type fail operative actuation system so designed and arranged as to tolerate any two passive type failures.

These and other objects and advantages of the invention are pointed out in the following description in terms of the embodiments thereof which are shown in the accompanying drawings. It is to be understood, however, that the drawings are for the purpose of illustration only and are not a definition of the limits of the invention. Reference is to be had to the appended claims for this purpose.

In the drawings:

FIGURE 3 is a sectional view of a modified form of the linear actuator of FIGURE 2 embodying the compact configuration of the present invention in which the follow-up means is mounted in a cavity provided by the motor and jackshaft bearings.

FIGURE 4 is another modified form of the linear actuator of FIGURE 2 and embodying the present invention and including the compact configuration in which a linear follow-up element is mounted within a cavity provided by the motor and jackshaft bearings.

Figure 1:
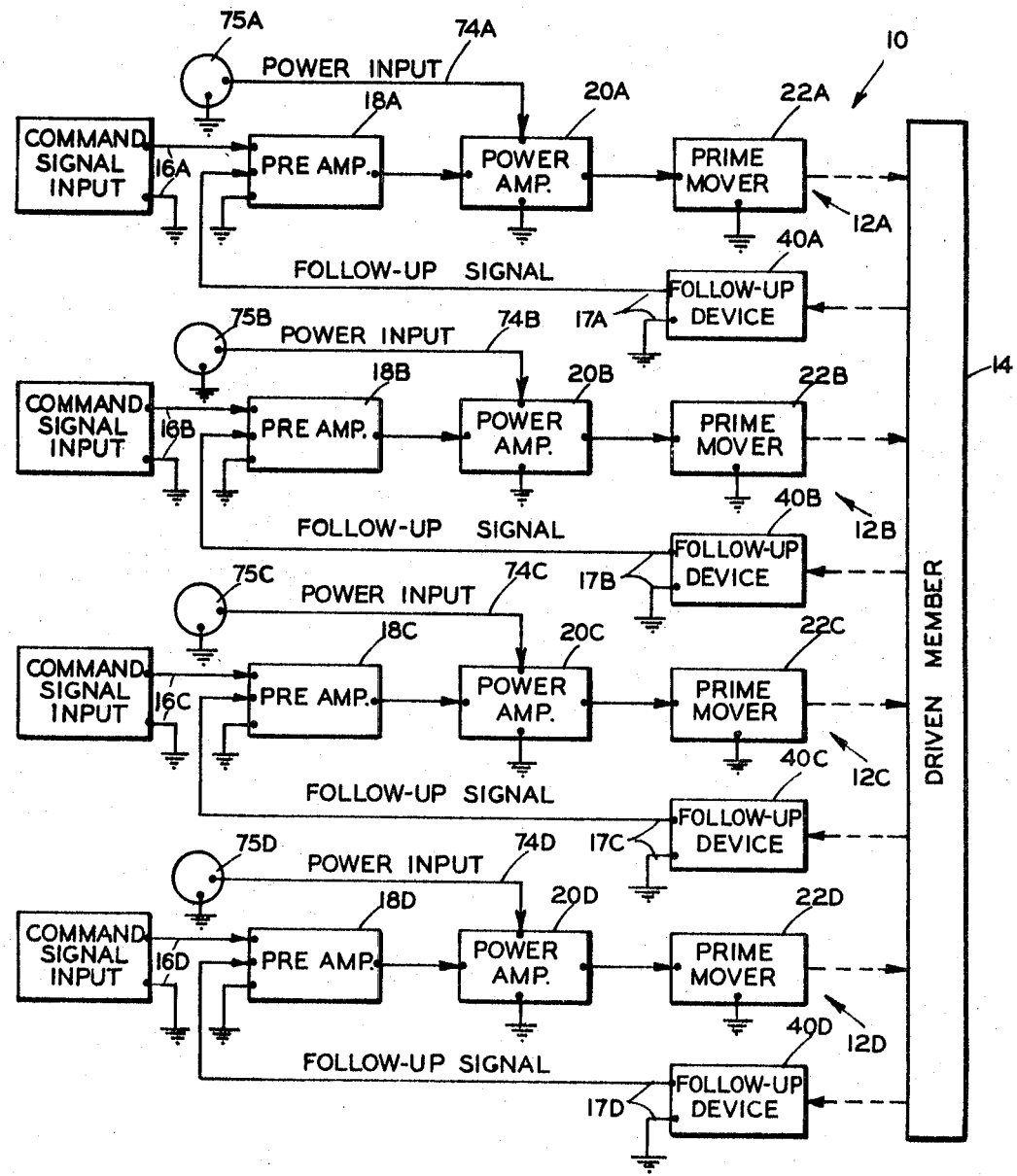
FIGURE 1 is a schematic block diagram of a quadruple redundant type fail operative actuation system embodying the present invention.
Figure 2:
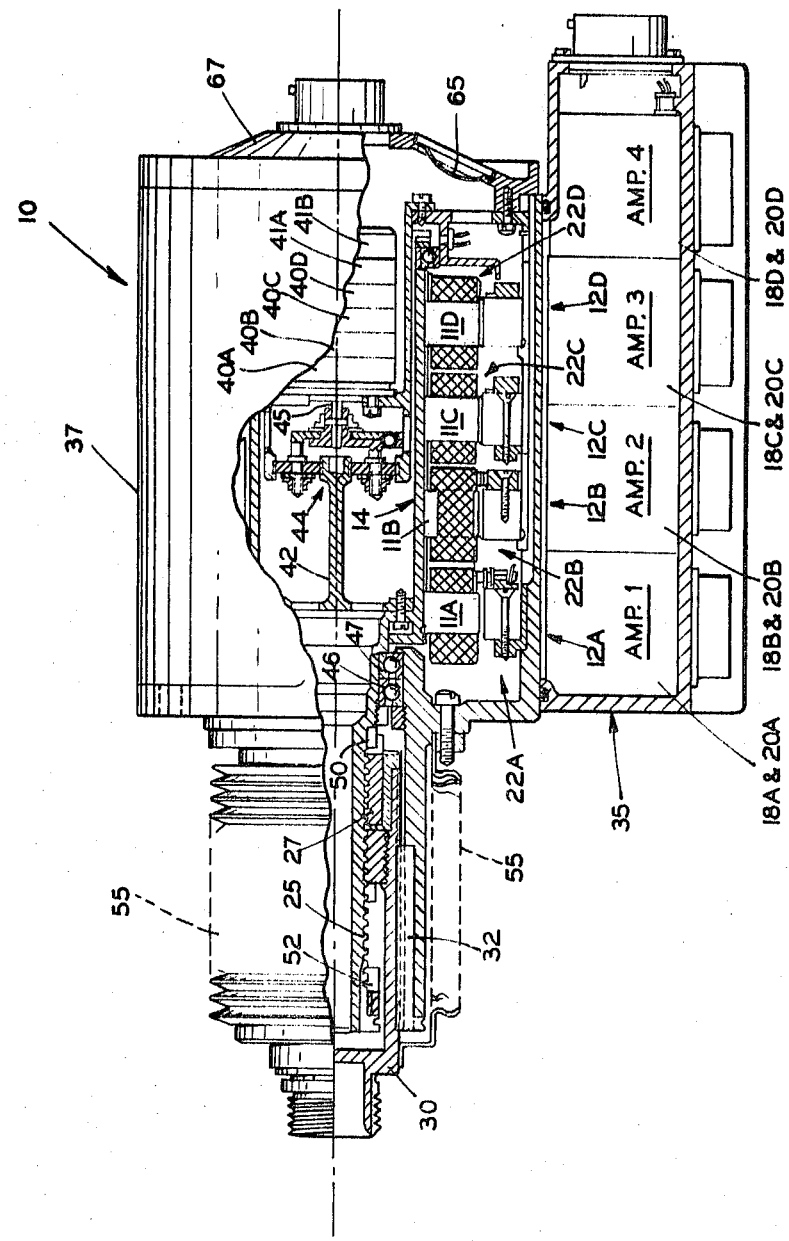
FIGURE 2 is a fragmentary sectional view of a linear actuator embodying the compact configuration of the present invention including the provision of a follow-up means mounted within a cavity provided by the motor and jackshaft bearings and including the quadruple redundant type fail operative actuation system shown by the block diagram of FIGURE 1.

Referring to the drawings of FIGURES 1 and 2, the linear actuator as shown by the schematic block diagram of FIGURE 1 and the fragmentary sectional view of FIGURE 2 is a fail operable electromechanical unit indicated generally by the numeral 10 and including motor rotors 11A, 11B, 11C and 11D mounted directly on the tubular jackshaft 14 and arranged in a parallel cooperative relation with stator elements of the servo motor systems 12A, 12B, 12C and 12D mounted on an inner surface of a housing of the unit 10. The unit 10 may be particularly adapted for use on a lunar landing spacecraft to precisely position, for example, the throttle of its descent engine.

The actuator unit has four complete servo systems indicated generally in FIGURES 1 and 2 by the numerals 12A, 12B, 12C and 12D which are arranged of equal output to drive a common tubular member or jackshaft 14.

The servo system is so arranged that any two servos provide the required output and any single channel failure will result in a fail operable mode. A suitable electrical input signal applied then across the lines 16A, 16B, 16C and 16D is effective to control the preamplifier 18A, 18B, 18C and 18D respectively, and thereby the power amplifier 20A, 20B, 20C and 20D so as to cause the prime mover or motor 22A, 22B, 22C and 22D to drive the driven member or jackshaft 14 in a sense to actuate the jackscrew 25 to cause a nut 27, in screw threaded engagement therewith as shown in FIGURE 2, to move axially along the jackscrew 25 causing a linear movement to be imparted to an output member 30.

The nut 27 and output member 30 being restrained from rotating with the jackscrew 25 by a splined guide bushing 32 so as to permit a linear movement thereof in a forward or reverse direction dependent upon the controlling sense of the servo motors 22A, 22B, 22C and 22D to in turn effect an accurate linear position of the output member 30.

As shown in FIGURE 2, a gasket sealed electronic package 35 contains the four preamplifiers 18A, 18B, 18C and 18D and the four amplifiers 20A, 20B, 20C and 20D and is mounted on a hermetically sealed motor and jackscrew housing 37. The jackscrew 25 is driven by the four torquers 12A, 12B, 12C and 12D which are mounted in axial alignment on the jackshaft 14 having a jackscrew portion 25 in axial alignment therewith.

A six gang potentiometer, including follow-up potentiometers 40A, 40B, 40C and 40D and instrumentation potentiometers 41A and 41B, are positioned within the tubular jackshaft 14 and driven by the jackshaft 14 through a shaft 42, single stage anti-backlash planetary gear reduction 44 and shaft 45, so as to cause the follow-up potentiometers 40A, 40B, 40C and 40D to supply electrical feedback signal information to the preamplifiers 18A, 18B, 18C and 18D, while the instrument potentiometers 41A and 41B may supply electrical position signals to two telemetry channels, not shown. The shaft 42, planetary gear reduction 44 and shaft 45 are positioned within the tubular jackshaft 14 and operatively connect the jackshaft 14 to the follow-up and instrument potentiometers also positioned within the tubular jackshaft 14, as shown by FIGURE 2.

The jackscrew portion 25 uses a triple thread and is supported so that thrust in either direction is taken by preloaded double-row bearings 46 and 47. Positive non-jamming stops limit the stroke of the jackscrew 25. Thus, a stop 50 is provided for limiting rotation of the jackscrew portion 25 of the jackshaft 14 in one direction while a second stop 52 is provided for limiting rotation of the jackscrew portion 25 in an opposite sense.

The guide bushing 32 is arranged to support the output shaft's underside loading and is splined so that a tortional load is supported by the main housing 37. A flexible bellows 55 is fastened at one end to the output member 30 and at the opposite end to the housing 37 so that the interior of the housing 37 may be pressurized to insure a maximum reliability in the hard vacuum and temperature of space.

There is further provided a diaphragm gross leak indicator 65 mounted in the cover 67 of the hermetically sealed casing 37 of the actuator so as to provide immediate visual indication of a vacuum therein without need of a lengthy leak test.

The actuator mechanism of FIGURE 2 then provides an actuation system as shown by the block diagram of FIGURE 1 so configured as to continue specified performance in the event of any single drive or follow-up failure. Such an arrangement is necessary to comply with high reliability requirements in critical applications where a performance degradation is catastrophic.

In such arrangement, the four prime movers 12A, 12B, 12C and 12D are so mounted as to actuate a single output member 30. The prime movers are each a part of a separate servo system which typically consists of the arrangement shown in FIGURE 1 including, for example, the preamplifier 18A which receives a command signal applied across the line 16A and a follow-up signal applied across lines 17A from a follow-up device or potentiometer 40A positioned by the driven member 14 so as to produce an output to control the power amplifier 20A. The power amplifier 20A in turn receives the input from the preamplifier 18A so as to control a power input applied through line 74A from a suitable power source 75A to the prime mover or motor 22A for adjustably positioning the driven member or jackscrew portion 25 of the jackshaft 14, as heretofore explained. The prime mover or motor 22A in turn receives power from the power amplifier 20A and applies power to the driven member 14. The follow-up device or potentiometer 40A in turn produces a signal as an input to the preamplifier 18A, as a function of the motion of the driven member 14.

In the four servo systems of FIGURE 1, corresponding parts have been indicated by like numerals to which the suffix A, B, C and D have been applied. The four servo systems each have power and signal inputs isolated from the others.

The servo systems are so designed and arranged that any two can produce the desired specified performance. If a single servo system malfunctions in such a way as to tend to cause undesired motion of the driven member 30, the remaining three operating systems will override the fail system and produce the desired specified performance.

In comparison to the servo system of the present invention, in an arrangement in which only three servo systems are provided, each system must have the capability to produce the specified performance. Furthermore, in a servo system with performance capability a function of system weight and power input, a system using four one-half performance servo systems would be lighter and use less power than three full performance servo systems by a ratio of two to three. Moreover, the quadruple system of the present invention may tolerate any two passive type failures. Thus in the present invention there is a quadruple passive-redundant fail operative servo system of lighter weight and power than a triplicated system. The trem passive is used meaning that there are no active system elements required to monitor for failures and either remove a failed element, engage a replacement element or both.

The arrangement is such that three servos will assume and maintain required performance when any one of the four servos may fail. The redundancy requirements are thus met by designing all of the servos to have equal output performance capabilities and any two servos to provide the required output performance. For a null type of inoperative failure, the malfunction servo will be driven along with the load by the three remaining servos.

A feature of the present invention is the provision of the motor rotors 11A, 11B, 11C and 11D mounted directly on the jackshaft 14 and further the compact arrangement of the subject actuator which includes a six gang potentiometer arrangement driven internally within the sealed actuator housing 37 by the planetary system 44.

Modified form of linear actuator

In the drawings of FIGURES 3, 4, 5 and 6 there are illustrated modified forms of the linear actuator of FIGURE 2 in which the motor rotor is mounted directly on a single jackscrew rotating member including a compact mechanical arrangement with rotary jackshaft and rotary nut and with a rotary or linear motion follow-up element mounted within the motor shaft or jackshaft.

The location of the rotor of the motor thereof on the jackshaft or jackscrews offers a blacklash free connection between the drive motors and the jackshaft. There is further provided a configuration that has no gearing and which offers a lower reflected rotor inertia to the output. The combination then of minimum backlash and low inertia provides a linear actuator servo system of higher performance capabilities than can be obtained by conventional means. If the configuration thus shown by FIGURES 3, 4, 5 and 6 is set up for a position servo system and with the addition of a tachometer to the shaft adjacent to the motor, the system is configured for a precision velocity servo with the advantages stated above.

Referring to the drawing of FIGURE 3, the linear actuator includes a stator 102 of an electric motor, jackshaft bearings 104 and a follow-up mount 116, all of which are mounted within the unit housing 101. The housing 101 is fastened at 100 to a fixed part. A tubular jackshaft 105 is mounted in the jackshaft bearings 104.

A rotor 103 of the electric motor is mounted on the tubular jackshaft 105 which is in turn arranged to rotate within the motor stator 102 in the bearings 104.

Rotation of the jackshaft 105 effects rotation of a jackscrew portion 106 thereof so as to cause an actuating nut 107 screw threadedly engaged on the jackscrew portion 106 to move axially thereon and linearly actuate a traveling tube 109 affixed to the nut 107 and restrained from rotation by a connection at 110 to a part to be linearly actuated.

A sun gear 111 projects axially within the tubular jackshaft 105 and is meshed with planet gears 112 rotatably mounted on a carrier 114. The planet gears 112 are also meshed with an internal gear 115 forming a part of the follow-up mount 116. The planetary gear carrier 114 is drivingly connected to an operating shaft 118 of a rotary follow-up device 120 which may be a potentiometer, synchro or other suitable electric follow-up signal generating device. Rotation of the jackshaft 105 causes rotation of a rotor element of the follow-up device 120 reduced by the planetary gear ratio. For a compact configuration, the follow-up device 120 and follow-up gear reduction 112–115 is mounted within the cavity created by the motor and jackshaft bearings.

In another modified form of the invention, shown by FIGURE 4, an electric motor stator 202, shaft bearings 204 and an electric follow-up signal generating device 209 including linearly movable follow-up element 208 are mounted within the unit housing 201. The housing 201 is fastened at 200 to a fixed part. A tubular jackshaft 205 is mounted in the shaft bearings 204, allowing a rotor 203 of the electric motor, mounted on the jackshaft 205 to rotate within the motor stator 202. Rotation of the tubular jackshaft 205 causes an actuating nut 206 affixed to the jackshaft 205 to rotate in screw threaded engagement with a traveling jackscrew 210 so as to cause jackscrew 210 to move axially with the jackscrew 210 restrained from rotation by a connection at 211 to a part to be linearly actuated. The follow-up element 208 moves axially with the jackscrew 210 causing the required linear input to the linear follow-up element 209. For a compact configuration, the follow-up device 209 is mounted within the cavity created by the motor and jackshaft bearings.

Figure 5:
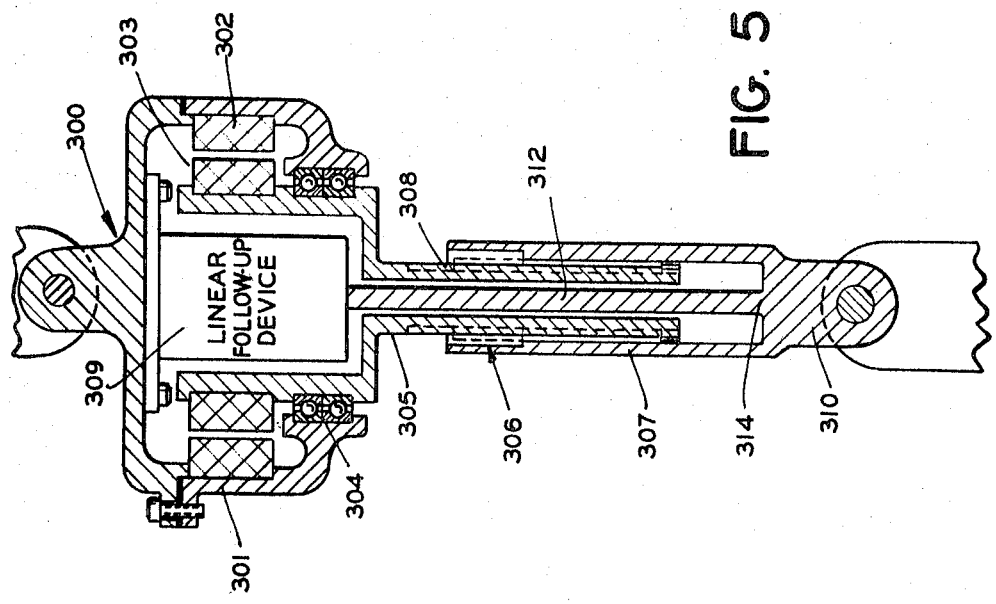
FIGURE 5 is a further modified form of the linear actuator of FIGURE 2 embodying the present invention and including a rotary jackshaft with linear follow-up element mounted within a cavity provided by the motor and jackshaft bearings.

In the third modified form of the invention shown by FIGURE 5, an electric motor stator 302, jackshaft bearings 304, an electric follow-up signal generating device 309 including a linearly movable follow-up element 312 are mounted within a unit housing 301. The housing 301 is fastened at 300 to a fixed part. A tubular jackshaft 305 is mounted in the jackshaft bearings 304, allowing the motor rotor 303, mounted on the tubular jackshaft 305, to rotate within the motor stator 302. Rotation of the tubular jackshaft 305 causes an actuating nut 306 carried by a traveling tube 307 and srcew threadedly engaged in a jackscrew portion 308 of the jackshaft 305 to move axially thereon with rotation of the jackshaft 305, with the traveling tube 307 being restrained from rotation by a connection at 310 to a part to be linearly actuated thereby. The follow-up element 312 is attached at one end 314 to and within the traveling tube 307 so as to move axially with the traveling tube 307 causing the required linear input to the linear follow-up device 309. For a compact configuration, the follow-up device 309 is mounted within the cavity created by the motor and jackshaft bearings.

Figure 6:
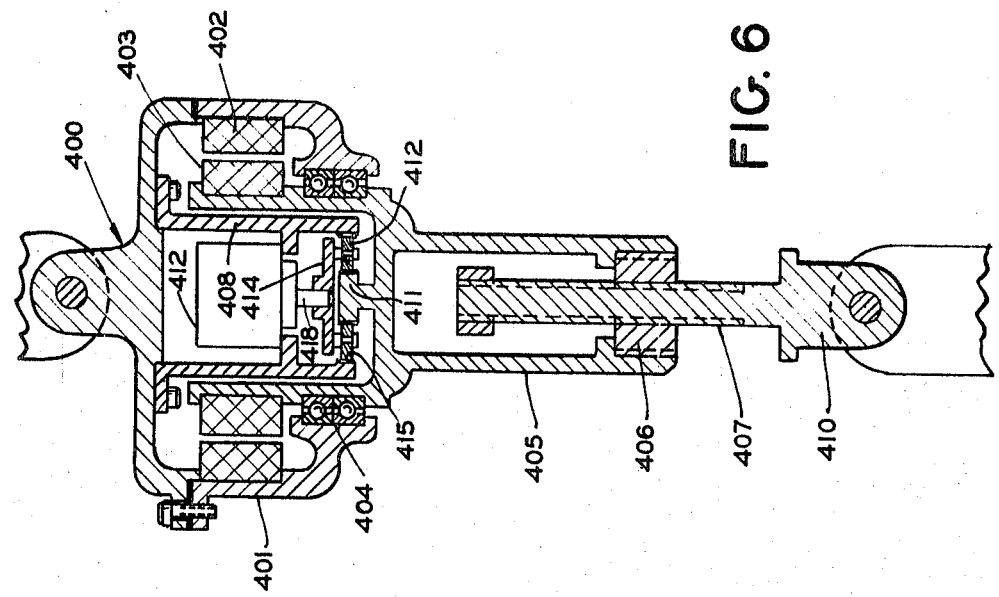
FIGURE 6 is a further modified form of the linear actuator of FIGURE 2 embodying the present invention and including a rotary nut with rotary follow-up element in which the rotary follow-up element and follow-up gear reduction is mounted within a cavity provided by the motor and shaft bearings.

In a further modified form of the invention shown by FIGURE 6, a stator 402 of an electric motor, shaft bearings 404 and follow-up mount 408 are mounted in the unit housing 401. The housing 401 is fastened at 400 to a fixed part. A tubular jackshaft 405 is mounted in the shaft bearings 404, allowing a motor rotor 403, mounted on the jackshaft 405 to rotate within the motor stator 402. Rotation of the tubular jackshaft 405 causes a nut 406 carried by the jackshaft 405 to rotate and a traveling jackscrew 407 to move axially with the jackscrew 407 being restrained from rotation by a connection at 410 to a part to be linearly actuated thereby. A sun gear 411 projects axially within the tubular jackshaft 405 and is meshed with planet gears 412 rotatably mounted on a carrier 414. The planet gears 412 are also meshed with an internal gear 415 forming a part of the follow-up mount 408. The planetary gear carrier 414 is drivingly connected to an operating shaft 418 of a suitable rotary electric follow-up signal generating device 412. Rotation of the shaft 418 causes rotation of a rotary element within the follow-up device 412 reduced by the planetary gear ratio. For a compact configuration, the follow-up device 412 and follow-up gear reduction 411–415 are mounted within the cavity created by the tubular motor shaft 405 and shaft bearings 404.

Although several embodiments of the invention have been illustrated and described, various changes in the form and relative arrangement of the parts, which will now appear obvious to those skilled in the art, may be made without departing from the scope of the invention. Reference is, therefore, to be had to the appended claims for a definition of the limits of the invention.

What is claimed is:

1. An actuator mechanism comprising a housing, a motor stator mounted in the housing, bearings mounted in the housing, a tubular jackshaft rotatably mounted on the bearings and including an extended tubular portion projecting into the motor stator, a rotor carried by the extended tubular portion of the jackshaft and cooperatively arranged in relation to the motor stator, the jackshaft having a jackscrew portion operative thereby, a follow-up device carried by the housing and mounted within the extended tubular portion of the jackshaft, means positioned within the extended tubular portion of the tubular jackshaft for operatively connecting the tubular jackshaft to the follow-up device, and linearly movable means operatively connected to said jackscrew portion of the jackshaft.

2. An actuator mechanism comprising a housing, a plurality of motor stator members mounted in the housing, bearings mounted in the housing, a tubular jackshaft rotatably mounted on the bearings and including an extended tubular portion projecting into the plurality of motor stator members, the plurality of motor stator members arranged in spaced relation along the extended tubular portion of the jackshaft, a plurality of rotor members mounted directly on the extended tubular portion of the jackshaft and in cooperative relation with the respective motor stator members, the tubular jackshaft including a jackscrew portion driven thereby, a follow-up device carried by the housing and mounted within the extended tubular portion of the jackshaft, means for operatively connecting the tubular jackshaft to the follow-up device, said operative connecting means being positioned within the extended tubular portion of said tubular jackshaft, and linearly movable means operatively connected to said jackscrew portion.

3. The combination defined by claim 2 in which the plurality of motor stator members and rotor members provide four separate servo motor systems cooperating in a parallel relation in which three of the servo prime mover motors will assume and maintain a required performance in the event any one of the four servo prime mover motors may fail.

4. The combination defined by claim 3 in which each of the four separate servo motor systems includes a preamplifier to receive a command signal and a follow-up signal to effect an output control signal, a power amplifier to receive an output control signal from the preamplifier so as to control a power input to the motor of the corresponding servo system, the motor to apply power to the tubular jackshaft under control of the power amplifier, and the follow-up device being operatively connected to the tubular jackshaft to produce a follow-up signal to be applied to the preamplifier as a function of the motion imparted to the tubular jackshaft by the servo motor systems.

5. The combination defined by claim 4 in which the four separate servo motor systems are so arranged and designed that any two may produce a specified performance so that in the event a single servo system malfunctions in such a way as to tend to cause an undesired operation of the tubular jackshaft the remaining three separate servo motor systems will act in parallel relation to override the failed motor system and produce the specified performance.

6. An actuator mechanism comprising a housing, a motor stator mounted in the housing, bearings mounted in the housing, a tubular jackshaft rotatably mounted on the bearings, a rotor carried by the jackshaft and cooperatively arranged in relation to the motor stator, a jackscrew drivingly connected to the tubular jackshaft, a follow-up device carried by the housing and mounted within the tubular jackshaft, a planetary gearing means positioned within the tubular jackshaft and including a sun gear driven by the tubular jackshaft, a ring gear, means mounted internally within the tubular jackshaft for supporting the ring gear within the tubular jackshaft, and planetary gears in toothed engagement with the sun gear and ring gear, a carrier member for the planetary gears drivingly connected to the follow-up device, the carrier member being positioned within the tubular jackshaft, and a linearly movable actuating member drivingly connected to said jackscrew.

7. An actuator mechanism comprising a housing, a motor stator mounted in the housing, bearings mounted in the housing, a tubular jackshaft rotatably mounted on the bearings and including an extended tubular portion projecting into the motor stator, a rotor carried by the extended tubular portion of the jackshaft and cooperatively arranged in relation to the motor stator, a jackscrew, a follow-up device carried by the housing and mounted within the extended tubular portion of the jackshaft, a linearly movable tubular actuating member, a nut carried by the tubular actuating member, the jackscrew being positioned in screw threaded engagement in the nut to effect axial movement of the actuating member upon angular movement of the tubular jackshaft, a follow-up shaft extending longitudinally within the tubular jackshaft and tubular actuating member, the follow-up shaft projecting into the extended tubular portion of the jackshaft and being operatively connected between the tubular actuating member and the follow-up device and axially movable within the tubular jackshaft upon axial movement of the tubular actuating member relative to the tubular jackshaft so as to effect a linear control of the follow-up device.

8. An actuator mechanism comprising a housing, a motor stator mounted in the housing, bearings mounted in the housing, a tubular jackshaft rotatably mounted on the bearings and including an extended tubular portion projecting into the motor stator, a rotor carried by the extended tubular portion of the jackshaft and cooperatively arranged in relation to the motor stator, a jackscrew, a follow-up device carried by the housing and mounted within the extended tubular portion of the jackshaft and the motor stator, a nut carried by the tubular jackshaft, the jackscrew being positioned in screw threaded engagement in the nut and being restrained from rotary movement, an actuating member operatively connected to one end of the jackscrew and linearly movable thereby upon angular movement of the tubular jackshaft, a follow-up shaft positioned in the tubular jackshaft and projecting from an opposite end of the jackscrew into the extended tubular portion of the jackshaft, the follow-up shaft being operatively connected between the jackscrew and the follow-up device and axially movable with the jackscrew in relation to the tubular jackshaft so as to effect a linear control of the follow-up device.

9. An actuator mechanism comprising a housing, a motor stator mounted in the housing, bearings carried by the housing, a tubular member rotatably mounted on the bearings, a rotatable motor element carried by the tubular member and cooperatively arranged in relation to the motor stator, a jackscrew, means for drivingly connecting the tubular member to the jackscrew, an electrical follow-up device, a supporting member for mounting the follow-up device within the tubular member, said supporting member being carried by the housing and projecting axially within the tubular member, a planetary gearing means positioned within the tubular member by the supporting member, said planetary gearing means including a sun gear driven by the tubular member and projecting axially within the supporting member, a ring gear formed a part of the supporting member and mounted internally therein, planetary gears, and a carrier member for rotatably supporting the planetary gears in toothed engagement with the sun gear and ring gear within the supporting member and tubular member, means positioned within the tubular member for drivingly connecting the carrier member to the follow-up device, a linearly movable actuating member, and means for drivingly connecting the jackscrew to the linearly movable actuating member.

10. An actuator mechanism comprising a housing, a motor stator mounted in the housing, bearings carried by the housing, a tubular member rotatably mounted on the bearings and including an extended tubular portion projecting into the motor stator, a rotatable motor element carried by the extended portion of the tubular member are cooperatively arranged in relation to the motor stator, a jackscrew, means for drivingly connecting the tubular member to the jackscrew, an electrical follow-up device carried by the housing and projecting within the extended portion of the tubular member, a linearly movable actuating member, means positioned within the tubular member and projecting into the extended portion of the tubular member for operatively connecting the linearly movable member to the follow-up device, and means for drivingly connecting the jackscrew to the linearly movable actuating member.

11. An actuator mechanism comprising a housing, a motor stator mounted in the housing, bearings carried by the housing, a tubular member rotatably mounted on the bearings and including an extended tubular portion projecting into the motor stator, a rotatable motor element carried by the extended tubular portion of the tubular member and cooperatively arranged in relation to the motor stator, a jackscrew, means for drivingly connecting the tubular member to the jackscrew, an electrical follow-up device carried by the housing and projecting within the extended tubular portion of the tubular member, a linearly movable actuating member, means positioned within the extended tubular portion of the tubular member for operatively connecting one of said members to the follow-up device, and means for drivingly connecting the jackscrew to the linearly movable actuating member.

12. An actuator mechanism comprising a housing, a plurality of electric motor stator elements mounted on an inner surface of the housing, bearings mounted in the housing, a tubular member rotatably mounted on the bearings and including an extended tubular portion projecting into the plurality of electric motor stator elements, the plurality of electric motor stator elements being arranged in spaced relation along the extended tubular portion of the tubular member, a plurality of rotor elements corresponding in number to the number of said electric motor stator elements, said rotor elements being mounted on the extended tubular portion of the tubular member and in cooperative relation with the respective electric motor stator elements, a jackscrew, means for drivingly connecting the tubular member to the jackscrew, an electric follow-up device carried by the housing and projecting axially within the extended tubular portion of the tubular member, a linearly movable actuating member, means positioned within the extended tubular portion of the tubular member for operatively connecting one of said members to the follow-up device, means for drivingly connecting the jackscrew to the linearly movable actuating member, and the plurality of electric motor stator elements and rotor elements providing four separate motor systems cooperating in a parallel relation in which three of the motor systems will assume and maintain a required performance in the event any one of the four motor systems may fail.

References Cited

UNITED STATES PATENTS

| | | | |
|---|---|---|---|
| 2,860,266 | 11/1958 | Schrader | 310—83 X |
| 2,978,621 | 4/1961 | Martinek | 310—83 X |
| 3,134,036 | 5/1964 | Fisher et al. | 310—83 X |
| 3,152,960 | 10/1964 | Alfred | 310—83 X |
| 3,168,665 | 2/1965 | Holper | 310—83 X |
| 3,309,588 | 3/1967 | Martin et al. | |
| 3,173,040 | 3/1965 | Cruzan | 310—83 |
| 3,264,502 | 8/1966 | Lytle et al. | 310—83 X |

ORIS L. RADER, Primary Examiner

THOMAS E. LYNCH, Assistant Examiner

U.S. Cl. X.R.

310—83; 318—28

UNITED STATES PATENT OFFICE
CERTIFICATE OF CORRECTION

Patent No. 3,457,479        Dated July 22, 1969

Inventor(s) Horace M. Varner

It is certified that error appears in the above-identified patent and that said Letters Patent are hereby corrected as shown below:

In claim 10, column 9, line 1 "are" should be -- and --

SIGNED AND SEALED
MAY 12 1970

(SEAL)
Attest:

Edward M. Fletcher, Jr.
Attesting Officer

WILLIAM E. SCHUYLER, JR.
Commissioner of Patents